Jan. 20, 1959  D. E. BECKETT ET AL  2,869,583
SPOOL VALVE
Filed May 24, 1955

INVENTORS
DONALD E. BECKETT
WILLIAM N. BECKETT
BY
J. Warren Kinney, Jr.
ATTORNEY

United States Patent Office 2,869,583
Patented Jan. 20, 1959

2,869,583

SPOOL VALVE

Donald E. Beckett and William N. Beckett, Wilmington, Ohio, assignors to Beckett-Harcum Co., Wilmington, Ohio, a corporation of Ohio Application May 24, 1955, Serial No. 510,686

9 Claims. (Cl. 137—625.42)

This invention relates to a valve, and particularly to a spool type valve for handling gaseous media under pressure.

An object of the invention is to teach a simple yet highly effective method of materially increasing the flow characteristics of a spool type valve for gaseous media and for materially reducing the amount of turbulence induced by gaseous media flowing under pressure between the valve ports and various passageways connected therewith.

A further object of the invention is to provide a spool type valve wherein the throats between the passageways for each of the various valve-ports have been modified whereby to materially decrease turbulence and substantially increase the rate of flow of gaseous media between the ports and their respective throats.

These and other objects are attained by the means described herein and as disclosed in the accompanying drawings, in which.

At the outset it should be noted that the present invention is directed generally to an improvement of spool type valves of the type disclosed in U. S. Patent No. 2,586,906 dated February 26, 1952. Such valves are ideally adapted to handle fluids and gaseous media, however it has been noted that the capacity and operating characteristics of such spool type valves have been somewhat impaired due to turbulence, when said valves have been utilized for controlling the flow of gaseous media under pressure.

Figure 1:
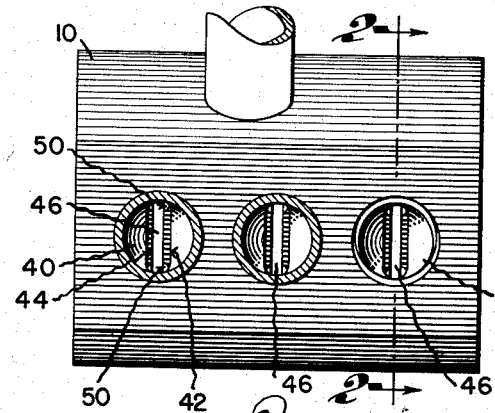
Fig. 1 is a side elevational view of a spool type valve involving the teachings of the present invention.
Figure 2:
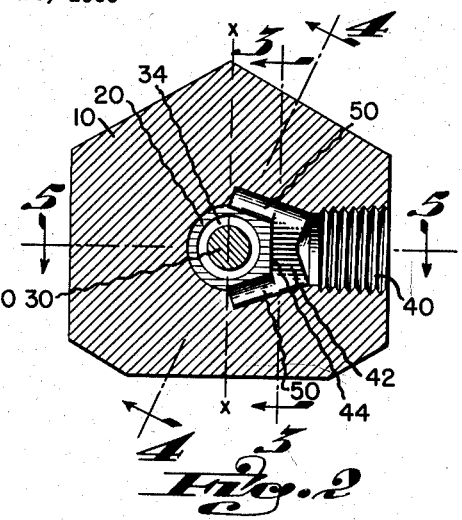
Fig. 2 is a cross-sectional view taken on line 2—2 of Fig. 1.
Figure 4:
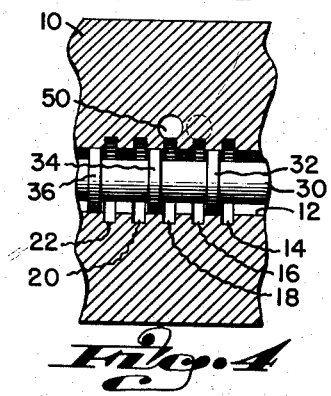
Fig. 4 is a sectional view taken on line 4—4 of Fig. 2.

With particular reference now to Figs. 1 and 2, the numeral 10 denotes generally the valve body of a spool type valve, said body, as illustrated in Fig. 4, having a longitudinal bore 12 extending axially therethrough, and having a plurality of annular ports 14, 16, 18, 20 and 22 disposed along and in open communication with said bore.

A spool or reciprocable valve member 30 is slidable in said bore, said member including pistons 32, 34 and 36, formed integral therewith, which are adapted to cover and uncover the various valve ports incident to reciprocation of spool member 30.

A substantially cylindrical passageway 40 is provided in one or more of the faces of the valve body, said passageway having an inner end which terminates in an axially disposed, substantially rectangular throat portion 42 having a bottom wall 44 provided with an elongate aperture 46 of a width approximating the width of one of the annular ports, and of a length approximating the diameter of a port.

It will be understood that a passageway 40 may be provided for each of the various annular ports 14, 16, 18, 20 and 22.

The present invention is directed to the provision of increasing by as much as 30% the flow characteristics of a given valve, when operated on a gaseous media under pressure, by providing secondary passageways between the ports and ends of throats 42, thereby greatly increasing the ability of gaseous media to flow between a port and its associated throat with an absolute minimum of turbulence, for greatly enhancing the efficiency and operating characteristics of a valve of given size.

Figure 5:
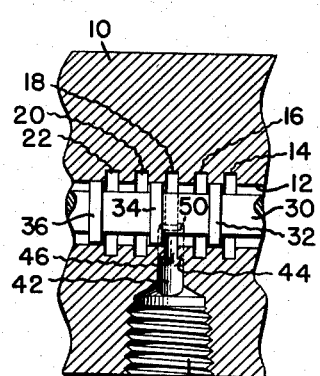
Fig. 5 is a sectional view taken on line 5—5 of Fig. 2.

With particular reference now to Figs. 2 and 5, the numerals 50 denote a pair of secondary passageways which extend beyond the bottom wall 44 of throat 42 toward and in open communication with the opposite sides of an annular port.

In the preferred embodiment of the invention, the diameter of the secondary passageways 50 approximate the width dimension of the rectangular throats, said passageways extending downwardly from and at opposite ends of each throat, the angle of divergency from the axis of passageway 40 ranging from 12 to 20 degrees. The length of the secondary passageways is sufficient to reach the maximum diameter of a port, that is, they should intersect axis $x$—$x$ of Fig. 2. It has been found that extending the length beyond axis $x$—$x$ accomplishes no useful purpose.

Figure 3:
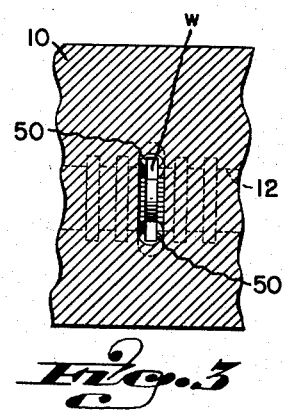
Fig. 3 is a sectional view taken on line 3—3 of Fig. 2.

Referring now to Fig. 1, it will be noted that the opening 46 in bottom wall 44 of throat 42 is of a width approximating the width dimension of a port. If said throat width be denoted by the letter $w$, see Fig. 3, then it has been found that optimum results will be obtained in those instances wherein the diameter of the secondary passageways 50 approximates $2w$.

As best illustrated in Fig. 2, the lower end of throat 42 is substantially square-ended, wherein bottom wall 44 is disposed in substantial parallelism with axis $x$—$x$, which axis is at right angles to the axis of passageway 40.

A decided advantage of the present invention is that the secondary passageways 50 may be provided in existing valves by a broaching operation for thereby substantially increasing their capacity and effectiveness.

As best illustrated in Fig. 2, the secondary passageways 50 dispose approximately half of the effective peripheral area of the port in open communication with passageway 40 via the modified throat. Such modification produces an increase in the capacity of the valve up to 30% and the elimination of turbulence further increases the overall efficiency of the valve.

Again referring to Fig. 2, it will be noted that in a completed valve the throat at the inner end of each of passageways 40 is actually U-shaped wherein the bottom wall 44 and adjacent portions of the divergent, secondary passageways 50 are in open communication with approximately one-half of the peripheral area of a port. In this manner and by this construction the pressure drop or differential between a port and its passageway 40 is materially reduced, thereby substantially increasing the efficiency and capacity of the valve without increasing its overall dimensions.

What is claimed is:

1. In a spool valve, a valve body having a longitudinal bore extending therethrough, an annular port disposed along and in open communication with said bore, a cylindrical passageway extending transversely of the longitudinal bore terminating in an axially disposed substantially rectangular throat having a bottom wall provided with an elongate aperture of a width approximating the width of the annular port, and of a length approximating the diameter of said annular port, said throat being wider than, and in open communication with said annular port, and a pair of secondary passageways each wider than the port, extending beyond the bottom wall of said throat in open communication with and on opposite sides of said throat and port.

2. A valve comprising a body having a longitudinal piston bore exending therethrough, and a plurality of annular ports in laterally spaced relationship disposed along and in open communication with said piston bore, said ports each having an outer peripheral wall uniformly spaced from the axis of the piston bore, a valve member slidable in said bore and including pistons for covering and uncovering certain of said ports as the valve member moves lengthwise within the bore, the valve body being drilled from the exterior thereof inwardly to provide a primary hole having an inner terminus remote from but in line with one of the ports aforesaid, said bore being extended beyond said inner terminus by a pair of secondary drilled holes divergently directed from said terminus toward opposite ends of a diameter of said one port, the secondary holes each having a blind end portion meeting and intersecting the outer peripheral wall of the port at locations near the outer ends of said diameter, the valve body material between the divergent holes being removed to provide a connecting slot which includes the inner terminus of the primary hole and adjacent portions of the divergent holes, and a throat connecting the blind end portions of the secondary holes, said connecting slot having a base apertured at the throat aforesaid, the aperture of the base forming part of the throat, and the throat extending through the peripheral wall of the port, thereby to place the slot in fluid communication with the port by way of said throat.

3. A valve comprising a body having a longitudinal piston bore extending therethrough, and a plurality of annular ports in laterally spaced relationship disposed along and in open communication with said piston bore, said ports each having an outer peripheral wall uniformly spaced from the axis of the piston bore, a valve member slidable in said bore and including pistons for covering and uncovering certain of said ports as the valve member moves lengthwise within the bore, the valve body being drilled from the exterior thereof inwardly to provide a primary hole having an inner terminus remote from but in line with one of the ports aforesaid, said bore being extended beyond said inner terminus by a pair of secondary drilled holes divergently directed from said terminus towards opposite ends of a diameter of said one port, the secondary holes each having a blind end portion meeting and intersecting the outer peripheral wall of the port at locations near the outer ends of said diameter, the valve body material between the divergent holes being removed to provide a connecting slot which includes the inner terminus of the primary hole and adjacent portions of the divergent holes, and a throat connecting the blind end portions of the secondary holes, said connecting slot having a base apertured at the throat aforesaid, the aperture of the base forming part of the throat, and the throat extending through the peripheral wall of the port, thereby to place the slot in fluid communication with the port by way of said throat, the width of the throat being equal to the width of the port, and the throat terminating wholly within the limits of the port between the blind ends of the divergent bores, the diameter of each of said divergent bores being of the order of twice the width of the throat.

4. A valve as specified in claim 3, wherein the angle included between the divergent bores ranges from a minimum of twenty-four degrees to a maximum of forty degrees.

5. A valve comprising a body having a longitudinal piston bore extending therethrough, and a plurality of annular ports in laterally spaced relationship disposed along and in open communication with said piston bore, said ports each having a pair of spaced side walls, and an intermediate outer peripheral wall uniformly spaced from the axis of the piston bore, a valve member slidable in said bore and including pistons for covering and uncovering certain of said ports as the valve member moves lengthwise within the bore, the valve body being drilled from the exterior thereof inwardly toward one of the ports aforesaid to provide a primary hole whose axis if extended would pass between the side walls of said one port, the primary hole having an inner terminus remote from said one port, said primary hole being extended beyond its inner terminus and toward said port by a pair of secondary drilled holes directed from said terminus toward opposite ends of a diameter of said one port, the secondary holes each having a blind end portion meeting and intersecting the outer peripheral wall of the port at locations near the outer ends of said diameter, the valve body material between the secondary holes being cut away to provide a connecting slot which includes the inner terminus of the primary hole and adjacent portions of the secondary holes, and a throat connecting the blind end portions of the secondary holes, said connecting slot having a base apertured at the throat with the aperture forming part of the throat, and the throat extending through the peripheral wall of said one port with opposite walls of the throat coinciding with the side walls of said port, thereby to place the slot in fluid communication with the port by way of said throat.

6. A valve as specified in claim 5, wherein the axes of the secondary holes diverge from the inner terminus of the primary hole toward the port periphery, and said axes rest in a common plane which bisects said one port at right angles to the slidable valve member axis.

7. In a spool valve, a valve body having a longitudinal bore extending therethrough, an annular port along and in open circumscribing communication with said bore, a cylindrical passageway extending transversely of the longitudinal bore and intersecting said port, said passageway terminating in an axially disposed, substantially rectangular throat portion wider than the axial width of said port, said throat terminating in a bottom wall having an elongate aperture therein in open communication with said port, the width of said aperture approximating the width of said port and the length of said aperture approximating the diameter of said port, and a pair of divergent secondary passageways at opposite ends of said aperture providing additional open communication between said port and throat portion.

8. In a spool valve, a valve body having a longitudinal bore extending therethrough, an annular port in open, circumscribing communication with said bore, said valve body provided with a first passageway disposed radially with respect to said longitudinal bore and extending inwardly from the exterior of the body toward and intersecting said annular port, said passageway terminating in a U-shaped throat which is wider than the axial width of said port, said throat having a bottom wall normal to the axis of said first passageway, said bottom wall having an elongate aperture therein in open communication with said port, a pair of outwardly divergent, secondary passageways interconnecting the first passageway with opposite ends of a diameter through said port normal to the axis of said first passageway, wherein the diameter of each of said secondary passageways approximates the width of said throat.

9. A valve as specified in claim 8, wherein the secondary passageways are each inclined from 12° to 20° relative to the axis of said first passageway.

References Cited in the file of this patent

UNITED STATES PATENTS

| | | |
|---|---|---|
| 2,105,536 | Kamsvaag | Jan. 18, 1938 |
| 2,436,992 | Ernst | Mar. 2, 1948 |
| 2,541,395 | Wilson | Feb. 13, 1951 |
| 2,581,430 | Mork | Jan. 8, 1952 |